United States Patent [19]

Nuttall

[11] Patent Number: 5,230,597

[45] Date of Patent: Jul. 27, 1993

[54] FASTENER

[76] Inventor: Jeffrey W. Nuttall, Blanchview Road, M.S. 224, Toowoomba, Queensland 4352, Australia

[21] Appl. No.: 700,145
[22] PCT Filed: Sep. 20, 1990
[86] PCT No.: PCT/AU90/00431
  § 371 Date: Nov. 1, 1991
  § 102(e) Date: Nov. 1, 1991
[87] PCT Pub. No.: WO91/04423
  PCT Pub. Date: Apr. 4, 1991

[30] Foreign Application Priority Data

Sep. 22, 1989 [AU] Australia ............... PJ6488

[51] Int. Cl.⁵ ............................. F16B 15/08
[52] U.S. Cl. .................. 411/453; 411/456; 411/487
[58] Field of Search ........... 411/456, 453, 452, 922, 411/446, 451, 487, 493

[56] References Cited

U.S. PATENT DOCUMENTS

| 791,442 | 6/1905 | Anderton | 411/453 |
|---|---|---|---|
| 1,444,618 | 2/1923 | Levingston | 411/453 |
| 1,619,944 | 3/1927 | Leonard | 411/453 |
| 1,638,671 | 8/1927 | Wagner | 411/456 X |
| 2,528,685 | 11/1950 | Brown | 411/456 X |
| 3,494,006 | 2/1970 | Brumlik | 411/456 X |
| 4,420,918 | 12/1983 | Arnoux et al. | 411/453 X |

FOREIGN PATENT DOCUMENTS

| 155135 | 10/1904 | Fed. Rep. of Germany | 411/456 |
|---|---|---|---|
| 456073 | 8/1913 | France | 411/456 |
| 847851 | 10/1939 | France | 411/451 |
| 239028 | 12/1945 | Switzerland | 411/453 |
| 306116 | 6/1955 | Switzerland | 411/452 |
| 13521 | of 1908 | United Kingdom | 411/453 |
| 124439 | 3/1919 | United Kingdom | 411/456 |
| 297768 | 5/1929 | United Kingdom | 411/456 |
| 351952 | 6/1931 | United Kingdom | 411/456 |

*Primary Examiner*—Rodney M. Lindsey
*Attorney, Agent, or Firm*—Griffin, Butler, Whisenhunt & Kurtossy

[57] ABSTRACT

A fastener comprising an elongate shank having a workpiece engaging end and a driving end. The shank is provided with at least one protrusion characterized by having a leading edge and a trailing edge. The leading edge is oriented in a direction non-parallel to any plane containing the longitudinal axis of the shank. The angle subtended between the leading edge and the longitudinal axis towards the driving end is less than 90 degrees, and chosen such that, in use, the fastener may be driven into the workpiece, the angle subtended between the trailing edge and the longitudinal axis towards the driving end being such that the trailing edge resists removal of the fixing member from the workpiece. Preferably the protrusion is welded to the shank.

6 Claims, 2 Drawing Sheets

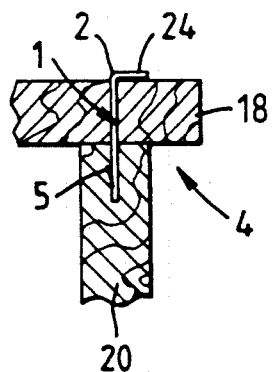
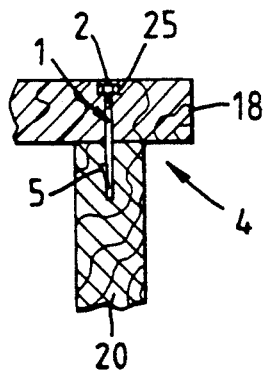
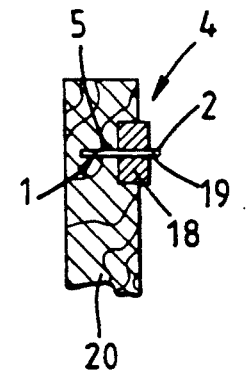
Fig. 7. Fig. 8. Fig. 9.
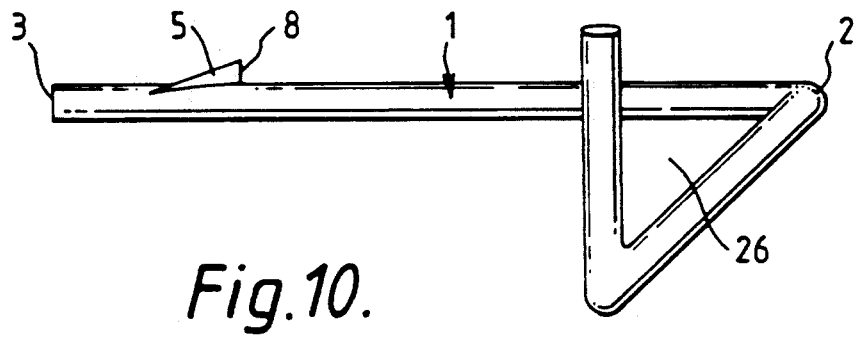
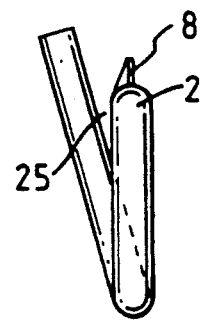
Fig. 10. Fig. 11.
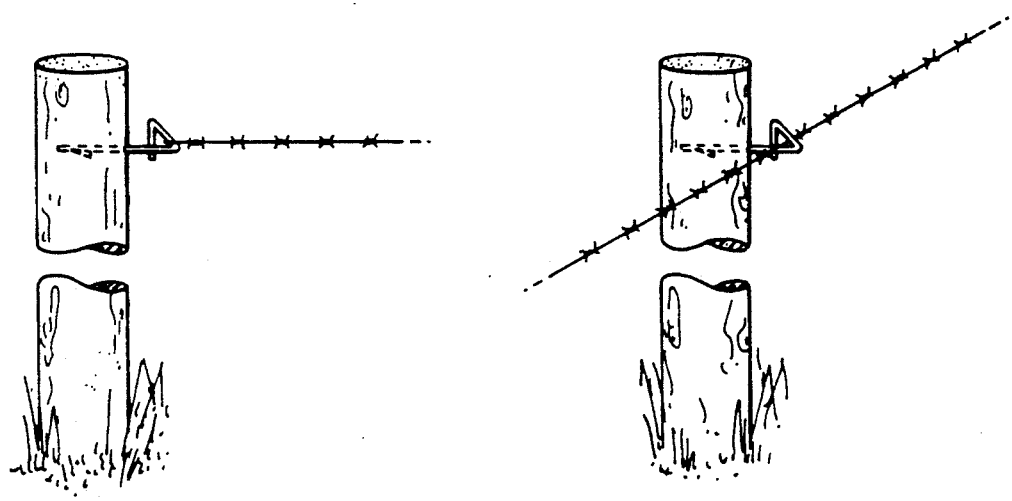
Fig. 12a. Fig. 12b.

FASTENER

This invention relates to a fastener and in particular relates to a fastener especially suitable for use in post and rail construction for cattle yards, fences and the like.

BACKGROUND OF THE INVENTION

Post and rail construction is widely used in a plethora of applications, including fencing, framing and scaffolding. The fasteners used for securing the generally vertical posts to generally horizontal rails have for the most part been the traditional coach bolt and nut, threaded rods with a nut both ends and other well known fixings.

In the art of post and rail fencing, it is known that wire tying, notching and strapping may be used in addition to the abovementioned prior art fixings.

Where coach bolts or threaded rods are proposed to be used for post and rail construction, the post and/or the rail is generally checked, notched or recessed to ensure positive location of the two members. The post and the rail are offered up or aligned and then drilled to provide a continuous hole for passage of the bolt or rod. The bolt or rod is then inserted through the hole to effect a joint between the post and rail. Subsequently washer(s) are fitted as required.

A disadvantage of this form of construction includes the protrusion of the bolt or threaded rod on both sides of the joint. In the case where threaded rods are used this protrusion is of a quite hazardous nature, the exposed threaded end of the rod being capable of inflicting injury to both personnel and livestock.

A second disadvantage lies in the requirement for a precise diameter hole to be drilled, large enough to ensure passage of the shank of the bolt, but not so large that the joint is sloppy.

Where wire tying is proposed, the last mentioned disadvantage is substantially overcome. However wire tying is labour intensive, involving the procedure of providing at least two holes drilled through both members, threading the tie wire through the holes and around a keeper and then crimping the disengaged ends under tension. The wire tied joint is also prone to loosening over time; since there is no provision for retightening a wire tie, the ongoing maintenance involves periodic replacement of the ties with the attendant high labour cost.

Loosening of the joint is also a problem for top rails secured to the top of posts by strapping. The strapping is generally affixed to opposed locations of the post by nailing. Although strapping is quick to instal and does not require the drilling of holes it has the added disadvantages of hazard wherein after a period of time the strap edge may extend or turn outwardly with the ancillary effect of nail loosening. It is also impossible to tension such strapping, resulting in a loose rail. To obtain the best possible result in strapping a top rail, it is desirable to V-notch the top of the post to accept the rail, which procedure is time consuming.

Upon a review of relevant prior art, it is clear that it is well known to provide barbs or protrusions on shanks or fasteners to resist withdrawal of the fastener from a workpiece. Thus for example in U.S. Pat. No. 4,653,486 there is described a fastener particularly suited for orthopedic use having a head, a tip, and a shank having a thread bearing zone and a thread free zone. The thread bearing zone includes a plurality of spaced barbs forming a discontinuous screw thread. Each protrusion in one embodiment was of uniform height not possessing a clearly defined leading edge and trailing edge and in another embodiment each protrusion had a leading arcuate surface again not possessing a clearly defined leading edge and trailing edge. One disadvantage of the particular fastener if used in post and rail construction was that it possessed limited holding strength by virtue of the fact that it would cut its own withdrawal track when forced into a wooden substrate and thus was relatively easily withdrawable. This fastener was also not appropriate for use with predrilled holes.

Similar comments could be made in relation to U.S. Pat. No. 3,983,779 which describes a sheet metal nail having a heading protrusion of pyramidal shape having a pointed vertex which provided a lead hole for subsequently located locking tangs on a shank of the rail. The locking tangs were punched from the metal sheet and included a leading portion and trailing portion offset to each other.

Again disadvantages as described above in relation to U.S. Pat. No. 4,653,486 and U.S. Pat. No. 3,983,779 were also applicable to other prior art which included West German specification 3335702 which included barbs orientated in a direction parallel to the longitudinal axis of the fastener, U.S. Pat. No. 3,850,073, U.S. Pat. No. 3,987,698, French Patent 2314318, U.S. Pat. No. 4,697,045, U.S. Pat. No. 4,395,174 and West German Specification 3836074. Another problem with these prior disclosures was that generally they referred to very specific applications which necessitated appropriate structural characteristics of the fastener dependent upon the precise application and as a result the fastener had little holding power when driven into substrates contemplated by the present invention. Thus for example U.S. Pat. No. 4,395,174 was directed to anchoring a sheet metal roofing panel to a roof support sheet metal beam, U.S. Pat. No. 4,653,486 discussed above was directed to a fastener for orthopedic use, U.S. Pat. No. 3,850,073 was directed to attachment of roofing insulation to a sheet metal base and U.S. Pat. No. 3,987,698, directed to a nail having a series of barbs in the form of wedge like ramps and having a smaller end directed at the tip or point of the nail was also directed to a specialized function totally unsuitable to insertion in predrilled holes in post and rail construction.

Reference may also be directed to U.K. Specification 2218061, U.K. Specification 1380500, U.S. Pat. No. 4,014,244, USSR Reference 842249, U.S. Pat. No. 4,454,875, U.S. Pat. No. 4,402,641, U.S. Pat. No. 4,233,878, U.S. Pat. No. 3,882,755, EP Specification 164432-A, West German Specification 3620372, West German Specification 2038885, USSR Specification 566981, West Germany Specification 3900870, Swedish Specification 8700352, French Specification 2582754, U.S. Pat. No. 4,718,802, French Specification 2570140, French Specification 2503290, Swedish Specification 8100909, West German Specification 3029923, West German Specification 3014745, West German Specification 3107403, U K. Specification 2063350, U.K. Specification 2021227, U.K. Specification 1442077 and West German Specification 2453891 as being background prior art not particularly relevant to the present invention.

SUMMARY OF THE INVENTION

Accordingly there is provided a fastener comprising an elongate shank having a workpiece engaging end and a driving end, said shank being provided with at least one protrusion, said at least one protrusion being characterized by having a leading edge and a trailing edge, said leading edge being oriented in a direction non-parallel to any plane containing the longitudinal axis of the shank, the angle subtended between the leading edge and the longitudinal axis towards the driving end being less than 90 degrees and chosen such that, in use, the fastener may be driven into the workpiece, the angle subtended between the trailing edge and the longitudinal axis towards the driving end being such that the trailing edge resists removal of the protrusion from the workpiece.

The elongate shank of the fastener, in accordance with the present invention may be of any cross-section consistent with the use intended. For example, the shank may be of round section where fabrication is from mild rod steel or other ferrous alloy. Conversely the shank may be of square or other section where a forged or stamped fastener is envisaged. It is particularly preferred to use round section mild steel rod since this material is relatively cheap and easy to work and is suitable for most fencing and general applications. The material chosen for the shank is dependent only on the application intended; where a fastener is to be driven into, for example, a compressed fibre material then it is envisaged that a reinforced plastics material may be employed.

The shank may be provided at the driving end or leading end with a threaded portion to accept a nut for completing the fastening process or may be provided with other retaining means such as one or more transverse perforations for split pins. Where castellated nuts are to be used, both a thread and a split pin holes may be provided.

Alternatively, the driving end of the fastener may have an end region formed thereon providing an integral retaining means such as a rounded head having a retaining abutment land on its inner surface, or a bent over region of the shank adapted to abut against the workpiece when the fixing member is driven home.

In another embodiment of the present invention the driving end of the fastener may be formed or configured as a wire cleat, preferably by bending or forging an open, generally triangular eye at the driving end in a manner analogous to conventional wire cleats.

Conversely, the ends of the fastener may be left plain such that the portion protruding from the workpiece after driving may be bent over to complete the fixing function of the fastener. In a particularly preferred embodiment, the shank of the fastener is threaded at the driving end and plain at the front end, and is driven into the workpiece such that the plain front end does not protrude through the workpiece alleviating one of the disadvantages of the prior art.

The threaded driving end of this preferred member may protrude from the work surface with sufficient thread showing to permit installation of a nut with or without a washer, or may be countersunk into the workpiece to provide sufficient thread in counter sink for installation of the nut.

The front end of the preferred shank may be sharpened, bevelled flat-ended or any other shape with it being particularly preferred to have a flat end for the reason of ease of manufacture. Such a flat ended fixing member is particularly suited to applications where a hole is pre-drilled in the workpiece, the hole being of a diameter sufficient to accept the shank, the said hole serving to provide a means of guiding the fixing member straight into the workpiece.

The at least one protrusion having a leading edge and a trailing edge serves to provide a resistance to extraction of the fastener from the workpiece. The leading edge serves the purpose of guiding the fastener into the workpiece in a substantially spiral movement in response to being driven in from the driving end by a hammer, pneumatic or explosive tool or other driving means. The leading edge is non parallel to any plane containing the axis such that this spiral rotation of the fastener into the work is effected. Of course, the angle subtended between the leading edge and the axis of the shank is dependent upon the material forming the workpiece. Where the fastener is to be driven into, for example, hardwood, then it is advantageous to use a protrusion with a leading edge at a small angle to the longitudinal axis of the shank in order to relieve excessive resistance to driving the fastener into the work. Where the fastener is to be driven into material somewhat softer than hardwood, it is envisaged that the angle between the leading edge and the longitudinal axis of the shank may be increased to increase the depth of the substantially spiral cut made in the work, which subsequently improves the pull-out resistance of the fastener.

Where the permissible depth of penetration is limited, it may be desirable to use a larger angle than would otherwise be preferred for a given material, the difficulty in driving the fastener being offset by the enhanced gripping action, for a given distance of penetration, of protrusions having leading edges making relatively larger angles to the longitudinal axis of the shank.

In all cases, the included angle between the leading edge of the at least one protrusion and the axis of the shank is less than 90 degrees, (and more suitably less than 45 degrees) since at 90 degrees the leading edge would cut a straight groove through the workpiece and would therefore not provide the pull-out resistance required of fasteners of the present invention. At angles of greater than 90 degrees the protrusion would tend to prevent the fastener from being driven.

The at least one protrusion may be of any width consistent with the object of causing a substantially spiral groove to be formed in the work as the shank is driven. Again, the limitations are chosen by the material of the workpiece, with narrow protrusions providing a fastener which is easier to drive into the work than one having a broad protrusion, and broad protrusions providing a fastener which will resist withdrawal more than one bearing a narrow protrusion. It is preferred to use as narrow a protrusion as practicable for ease of driving, consistent with the protrusion being of sufficient strength and pull-out resistance to achieve a desired result.

The protrusions may be planar, curved or any other shape consistent with the constraints applied hereinbefore to the leading and trailing edges. Preferably, for ease of fabrication of the fixing member, the protrusions are cut, stamped or otherwise profiled from the chosen sheet material such as the especially preferred mild steel. An edge is generally provided on the protrusion blank conforming to the shape of the shank at the point of attachment of each protrusion to facilitate fabrication of the fixing member Preferably the protrusions are welded to the shank.

The trailing edge of the protrusion is preferably parallel to a plane containing the axis of the shank of the fastener or at a slight acute angle thereto. This constraint may ensure that the fixing member, when subjected to a force tending to withdraw it from the workpiece, will not tend to spiral the protrusion back out along the substantially spiral groove cut by the leading edge thereof.

The trailing edge is also disposed at an angle to the longitudinal axis of the shank subtended towards the driving end such that the trailing edge does not tend to cut its way back through the workpiece when the fixing member is subjected to the aforementioned withdrawing force. This angle will generally be chosen in accordance with the material of the workpiece. For example, when the fastener is for use in hardwoods, a trailing edge substantially normal to the axis is preferred, whereas for softer materials, a lesser angle is preferred to provide the trailing edge with the facility to "gather" material in response to the withdrawing force in the nature of the barb of a fish hook.

Accordingly, the trailing edge may be straight, curved or of any other profile consistent with the aforementioned limitations, with it being particularly preferred to use a straight trailing edge.

The leading and trailing edges of the at least one protrusion may meet at a point, or they may have disposed therebetween a region of the protrusion for the purpose of providing sufficient longitudinal dimensions to the protrusion to give strength sufficient for a particular application.

Such a region interposed between the leading and trailing edges may also improve the pull-out resistance of the fastener yet further, at the expense of being more difficult to drive than the corresponding fastener not having this region.

In any case where such a protrusion is contemplated, it is desirable that the edge between the leading and trailing edges neither detracts from the leading edge function of cutting a substantially spiral path for the protrusion, nor detracts from the trailing edge function of providing pull-out resistance. To this end, it is particularly preferred that such an edge not have any point at a greater radial distance from the axis of the shank than the maximum radial extent of both the leading and the trailing edges.

Where the use of more than one protrusion is contemplated, it is preferred that protrusions of the same type are employed, for the purpose of eliminating the tendency of differing spiral-cutting actions causing unnecessary strain on the protrusions. It is particularly preferred to use like protrusions so disposed about the shank of the fastener such that each protrusion cuts its own substantially spiral groove through the work, that is, the respective protrusions ar each available to provide pull-out resistance for the fastener independently of each other protrusion. To this end the protrusions may be oriented diametrically or at other angular displacements about the shank, with or without being longitudinally displaced relative to one another, provided the aforementioned condition of the substantially spiral grooves not coinciding is preserved.

The present invention is further described with reference to the accompanying drawings of embodiments of the invention.

BRIEF DESCRIPTION OF THE DRAWINGS

FIGS. 7 to 9 illustrate typical applications of fasteners in accordance with the present invention.

FIG. 10 is a side view of a wire cleat fastener in accordance with the present invention.

FIG. 11 is an end view of the wire cleat of FIG. 7.

FIGS. 12 (a) and 12 (b) are two views of the wire cleat of FIG. 10 in use.

DESCRIPTION OF PREFERRED EMBODIMENTS

Figure 6:
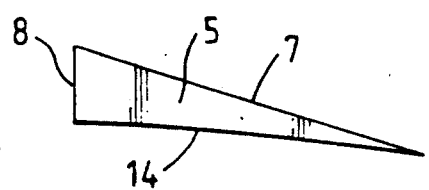
FIG. 6 is a side view of al typical protrusion for use in fabrication of fasteners in accordance with the present invention.

In the drawings, fasteners are illustrated having a round-section, elongate shank 1, having a driving end 2 adapted to be driven by a driving tool such as a hammer, or explosive or pneumatic tool. The shank 1 has a work engaging front end 3; in the embodiments illustrated this front end is squared-off, providing a fastener adapted to be driven into a predrilled hole in the workpiece. Each of the embodiments illustrated bears a planar protrusion 5, as illustrated in isolation at FIG. 6, having a leading edge 7 and a trailing edge 8.

Figure 1:
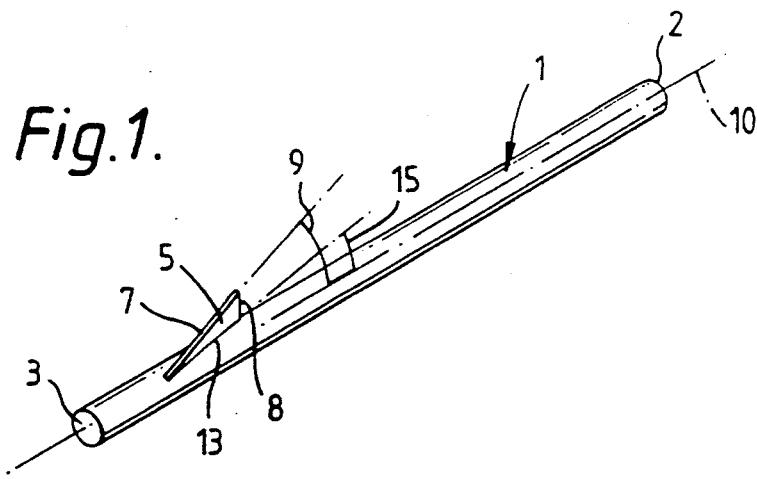
FIG. 1 is a side view of a plain-ended fastener in accordance with the present invention.
Figure 2:
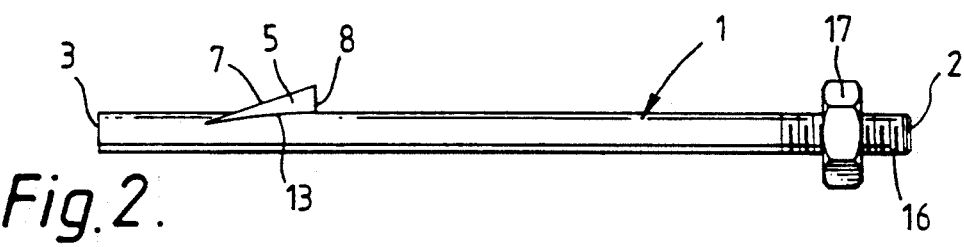
FIG. 2 is a side view of a threaded fastener in accordance with the present invention.
Figure 5:
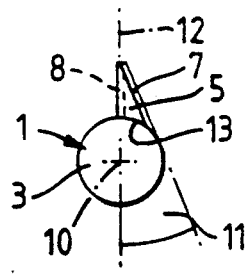
FIG. 5 is an end view of the fastener of FIG. 1.

The leading edges 7 of the protrusions of the embodiments illustrated at FIGS. 1, 2 and 5 are straight, i.e. are of constant direction and disposed at an angle 9 of approximately 10–15 degrees to a horizontal plane containing the longitudinal axis 10 of the shank 1 and are disposed at an angle of approximately 23 degrees to a vertical plane 12 containing the longitudinal axis 10 of the shank 1. These angles have been found particularly suitable for protrusions on fasteners for use with most timbers commonly used in fencing applications.

Figure 3:
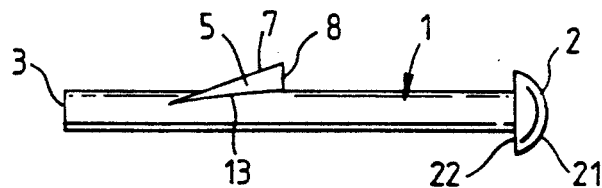
FIG. 3 is a side view of a round-ended fastener in accordance with the present invention.

Conversely, the embodiment of FIG. 3 shows a fastener adapted for use where the permissible depth of penetration is limited such as in railway line spikes. In this case, the angles corresponding to the aforementioned angles 9 and 11 are increased beyond the optimum values for driving into the hardwood material used, in order to obtain adequate grip within the aforementioned permissible depth.

Figure 5A:
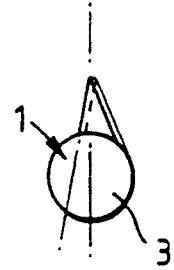
FIG. 5A is an alternative view of the fastener of FIG. 1 showing the invention of the trailing edge in relation to a vertical plane containing the longitudinal axis of the fastener.

The trailing edges 8 of the embodiments illustrated are normal to the shank 1 and are disposed in the said vertical plane 12 or offset at a relatively small acute angle thereto of the order of 5–10 degrees as shown in FIG. 5A.

Each protrusion 5 is welded to the shank 1 along a curved weld line 13, the protrusion being formed with a curved edge 14 for this purpose. In the embodiments illustrated at FIGS. 1, 2 and 5, this weld line 13 makes an angle 15 of approximately 15 degrees with the axis 10.

In the embodiment illustrated at FIGS. 2 and 8, the driving end 2 of the shank 1 is provided with a threaded portion 16 adapted to receive a nut 17 which in use retains the second member 18 of the workpiece 4 on the shank 1.

In the embodiment illustrated at FIGS. 1 and 9, the plain driving end 2 is adapted to be bent over at 19 as illustrated in FIG. 9 to perform the function of retaining the second member 18 on the shank 1. The embodiment at FIG. 9 also illustrates the second member 18 having been checked into the first member 20 to provide a mechanical key between the members.

Figure 4:
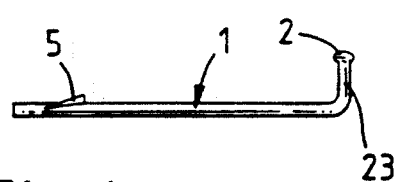
FIG. 4 is a side view of a fastener in accordance with the present invention and adapted to provide a climbing rung.

The embodiment illustrated at FIG. 3 has been provided with a driving end 2 rounded to provide a smooth curved surface 21 which is unlikely to be injurious, together with an abutment land 22 adapted to limit the depth of penetration of the fastener. The embodiment of FIG. 4 is adapted to provide a climbing rung having an upturned portion 23 adapted to provide a stop to prevent a foot from slipping off the end of the rung.

The embodiment of FIG. 7 depicts a fastener in use having an abutment portion 24 of the shank 1 preturned at right angles to the longitudinal axis of the shank 1 in order to provide retention of the second member 18.

In use, the front end 3 of the illustrated fasteners is applied to a predrilled hole in the workpiece 4, the predrilled hole extending through the second member 18 and into the first member 20 at least to the depth required for fixing. The driving end 2 is then subjected to a driving force urging the shank 1 of the fixing member straight into the predrilled hole, the predrilled hole providing guidance for the shank 1. When the protrusion 5 of the fastener is driven into the member 18, a substantially spiral motion is imparted to the fixing member as the leading edge 7 of the protrusion 5 commences to cut a substantially spiral groove into the workpiece 4. The fastener is driven through the second member 18 and into the first member 20 such that the protrusion 5 is sufficiently embedded in said second member 20. In the case of the embodiments illustrated in FIGS. 1 and 9, the fastener is driven in to the extent that the protruding driving end 2 of the shank may be bent as illustrated at 19.

In the case of the embodiments illustrated at FIGS. 2 and 8, the fastener is driven such that sufficient threaded portion 16 is exposed from the work to enable installation of the retaining nut 17 either by allowing the threaded portion 16 to protrude above the surface of the member 18 or by providing a countersink 25 in the member 18 whereby the threaded portion, 16 may be driven flush with the surface of the member 18.

In the case of the embodiments of FIGS. 3 and 7, the fastener is driven until the abutment portions 22 and 24 respectively contact the surface of member 18.

In the case of the climbing rung embodiment of FIG. 4, the rung is driven into a single member for a distance sufficient to retain the rung in its operative position against the expected load without bending.

In the embodiment illustrated at FIGS. 10 to 12 (a) and (b), the shank portion 1 has been formed into a triangular wire cleat at its driving end 2, preferably by bending. The formed triangular end is open at 25 to permit a strand of wire to be located through the triangular eyelet or aperture 26 of the cleat without threading. Advantages of this kind of wire cleat over the present wire cleats include its ease of attachment to both trees and posts. Also, the wire strand is attached to the cleat without threading, making it practical to replace existing cleats with the present inventive cleat without having to rethread the strand. This facility is useful where a fence is to be dismantled, or the strand temporarily dropped. Since there are no ties involved and the strand need only be unhooked from the cleats, with or without relieving strain as necessary.

Whilst the above embodiments are representative of typical usage of fasteners in accordance with the present invention, the scope of the invention is not limited thereto. It is envisaged that fasteners in accordance with the present invention may be useful for providing an alternative to prior art nails, screws, gate stanchions, hooks and eyes, linesman's pitons and any other application where a blind fixture may be driven into a permissive material.

I claim:

1. A fastener comprising an elongate shank having a workpiece engaging end and a driving end, said shank being provided with at least one protrusion, said at least one protrusion being characterized by having a leading edge of constant direction and a trailing edge of constant direction, said leading edge being oriented in a direction non-parallel to any plane containing the longitudinal axis of the shank and having a subtended angle between the leading edge and the longitudinal axis towards the driving end of less than 90 degrees and chosen such that, in use, the fastener may be driven into the workpiece, a subtended angle between the trailing edge and the longitudinal axis towards the driving end being such that the trailing edge resists removal of the fastener from the workpiece.

2. A fastener as claimed in claim 1 wherein said at least one protrusion is formed from metal plate having a substantially uniform thickness.

3. A fastener as claimed in claim 1 wherein said at least one protrusion is welded to the shank.

4. A fastener as claimed in claim 3 wherein the shank is substantially circular in cross section and said protrusion is welded to said shank along an arcuate bottom edge corresponding to the curvature of the shank.

5. A fastener as claimed in claim 1 wherein the trailing edge is oriented normal to a vertical plane containing the longitudinal axis of the shank or at a slight acute angle thereto.

6. A fastener comprising an elongate shank having a workpiece engaging end and a driving end, said shank being provided with at least one protrusion, said at least one protrusion being characterized by being formed from metal plate having a peripheral edge having a leading edge part and a trailing edge part, said leading edge part being oriented in a constant direction non-parallel to any plane containing the longitudinal axis of the shank, the angle subtended between the leading edge and the longitudinal axis towards the driving end being less than 90° and the trailing edge part being oriented in a constant direction normal to a longitudinal axis of the shank or at a slight acute angle thereto such that, in use, the fastener may be driven into the workpiece, the angle subtended between the leading edge and the longitudinal axis towards the driving end being such that the trailing edge resists removal of the fixing member from the workpiece.

* * * * *